(12) United States Patent
Szupryczynski et al.

(10) Patent No.: US 8,674,312 B2
(45) Date of Patent: Mar. 18, 2014

(54) RADIATION DETECTION WITH OPTICAL AMPLIFICATION

(75) Inventors: Piotr Szupryczynski, Knoxville, TN (US); Matthias Schmand, Lenoir City, TN (US); Mark Andreaco, Knoxville, TN (US); James Corbeil, Knoxville, TN (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 187 days.

(21) Appl. No.: 13/426,667

(22) Filed: Mar. 22, 2012

(65) Prior Publication Data

US 2013/0032722 A1 Feb. 7, 2013

Related U.S. Application Data

(60) Provisional application No. 61/514,061, filed on Aug. 2, 2011.

(51) Int. Cl.
 *G01T 1/20* (2006.01)
(52) U.S. Cl.
 USPC .......................................................... 250/366
(58) Field of Classification Search
 USPC .......................................................... 250/366
 See application file for complete search history.

(56) References Cited

U.S. PATENT DOCUMENTS

| 4,859,015 A | * | 8/1989 | Krinsky et al. | 398/212 |
| 5,434,878 A | * | 7/1995 | Lawandy | 372/43.01 |
| 2003/0142704 A1 | * | 7/2003 | Lawandy | 372/21 |

OTHER PUBLICATIONS

Vasil'ev, Peter "Ultrafast Diode Lasers: Fundamentals and Applications," Artech House, Inc., 12 page excerpt (1995).
Tsang et al., "Q-Switched Semiconductor Diode Lasers", IEEE J. of Quantum Electronics, Vol QE-19, pp. 145-156 (1983).
Tsang et al., "Intracavity Loss Modulation of GaAsInP Diode Lasers," Appl. Phys. Lett., vol. 38, pp. 120-122 (1981).
Arakawa et al., "Active Q-Switching in a GaAs/GaAlAs Multiquantum Well Laser with an intracavity Loss Modulator," Appl. Phys. Lett., vol. 48, pp. 561-563 (1986).

* cited by examiner

*Primary Examiner* — Kiho Kim
(74) *Attorney, Agent, or Firm* — Peter Kendall

(57) ABSTRACT

A device for detecting ionizing radiation includes a radiation interaction region configured to generate light in response to an interaction with the ionizing radiation, an optical gain medium region in optical communication with the radiation interaction region and configured to amplify the light, and an energy source coupled to the optical gain medium region and configured to maintain a state of population inversion in the optical gain medium region. The optical gain medium region has an emission wavelength that corresponds with a wavelength of the light generated by the radiation interaction region.

28 Claims, 6 Drawing Sheets

RADIATION DETECTION WITH OPTICAL AMPLIFICATION

CROSS-REFERENCE TO RELATED APPLICATION

This application claims the benefit of U.S. provisional application entitled "Q-switch Laser Based Radiation Detector with Gamma Activated Waveguide," filed Aug. 2, 2011, and assigned Ser. No. 61/514,061, the entire disclosure of which is hereby incorporated by reference.

BACKGROUND

The present embodiments relate to detecting ionizing radiation.

Nuclear medicine senses radiation emission to acquire images that show the function and/or physiology of organs, bones or tissues of the body. Radiopharmaceuticals are introduced into the body by injection or ingestion. These radiopharmaceuticals are then found in specific target organs, bones, or tissues of interest. The radiopharmaceuticals cause gamma photons to radiate from the body, which are then captured by detectors. The interactions of the gamma photons with scintillation crystals of the detectors produce flashes of light. The light is detected by an array of optical sensors in each detector.

Positron emission tomography (PET) is a nuclear medicine imaging technique that uses positron emitting radionuclides. PET is based on coincidence detection of two gamma photons produced from single positron-electron annihilation. The two gamma photons travel in opposite directions from the annihilation site, and can be detected by two opposing detectors of a ring of detectors. Annihilation events are typically identified by a time coincidence in the detection of the two gamma photons. The opposing detectors identify a line-of-response (LOR) along which the annihilation event occurred.

The quality of PET images is improved when the timing resolution allows a more detailed comparison of the arrival times of the two gamma photons. Some PET systems use the comparison to determine the time of flight of each gamma photon from the annihilation site. So called time-of-flight PET systems use the time-of-flight information to determine where along the line of response the annihilation occurred. The annihilation site is thus located more accurately, improving the PET image.

Regardless of the approach, actual detection of the gamma radiation is needed. The interaction of the gamma photons with a scintillation crystal of the detector produces a flash of light, but the clarity and/or quality of the detection may be improved.

BRIEF SUMMARY

By way of introduction, the preferred embodiments described below include devices and systems for detecting ionizing radiation and/or imaging based on the detected ionizing radiation. Optical gain or amplification is used to facilitate the detection of the ionizing radiation.

In a first aspect, a device for detecting ionizing radiation includes a radiation interaction region configured to generate light in response to an interaction with the ionizing radiation, an optical gain medium region in optical communication with the radiation interaction region and configured to amplify the light, and an energy source coupled to the optical gain medium region and configured to maintain a state of population inversion in the optical gain medium region. The optical gain medium region has an emission wavelength that corresponds with a wavelength of the light generated by the radiation interaction region.

In a second aspect, a system for imaging based on emissions of ionizing radiation includes a set of detectors. Each detector includes a scintillation crystal configured to generate light in response to an interaction with the ionizing radiation, and an optical amplifier in optical communication with the scintillation crystal and configured to amplify the light. The system further includes a power source coupled to the detectors and configured to establish a state of population inversion in the optical amplifier of each detector of the set of detectors, and a processor in communication with the set of detectors to generate scan data based on the interaction with the ionizing radiation.

In a third aspect, a system for imaging based on emissions of ionizing radiation includes a set of detectors. Each detector includes a radiation interaction region configured to generate Cherenkov radiation in response to interaction with the ionizing radiation, and an optical amplifier in optical communication with the scintillation crystal and configured to amplify the Cherenkov radiation. The system further includes a power source coupled to the set of detectors and configured to establish a state of population inversion in the optical amplifier of each detector of the set of detectors, and a processor in communication with the set of detectors to generate scan data based on the interaction with the ionizing radiation.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

Figure 1:
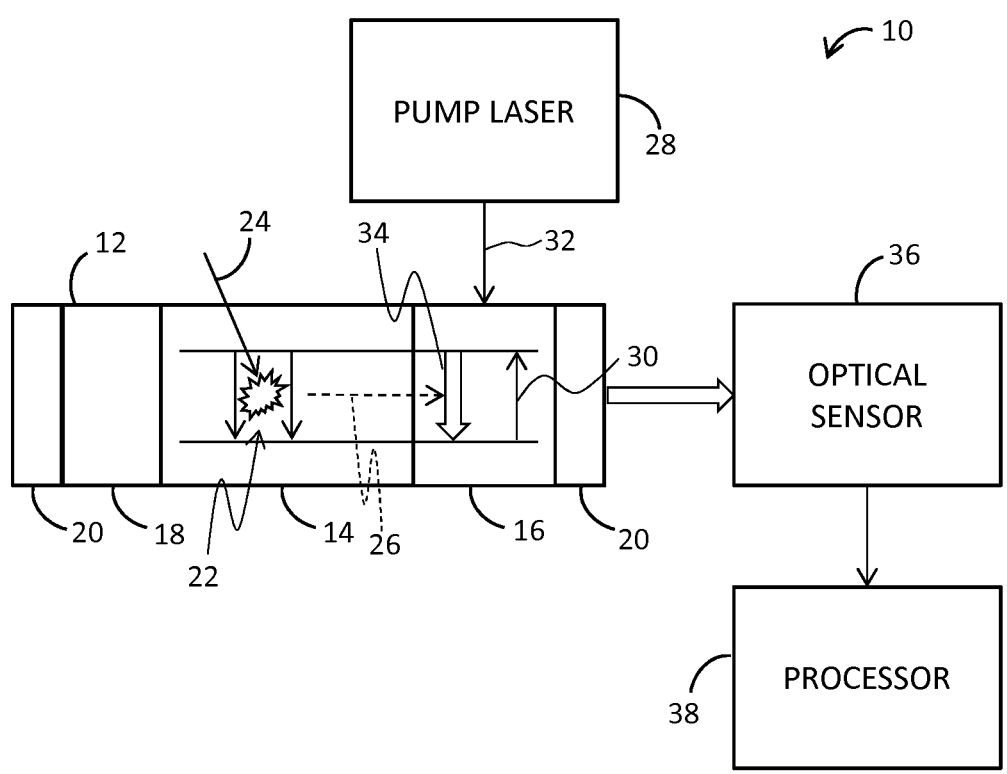
FIG. 1 is a schematic diagram of a radiation detector with an optically pumped gain medium region for optical amplification according to one embodiment.

Devices and systems that detect ionizing radiation, such as gamma radiation, are described. The disclosed devices and systems are configured for optical amplification of the light generated by the ionizing radiation. For example, the disclosed devices and systems may include one or more components operable as a scintillator light amplifier or a Cherenkov light amplifier. The systems may be imaging systems, such as medical imaging systems. The devices and systems may improve the timing resolution of nuclear imaging techniques, such as PET.

The optical amplification may occur in an optical gain medium of the disclosed devices. The optical amplification may be achieved as a result of laser action or other optical gain stimulated by a scintillator emission or other emission (e.g., Cherenkov emission) generated via interaction with the incident ionizing radiation. For example, incoming scintillator photons that have a wavelength corresponding to the emission wavelength of the optical gain medium may cause a stimulated emission in the optical gain medium. The stimulated emission results in an amplified optical pulse.

Detection of the ionizing radiation may be facilitated by the optical amplification. In some embodiments, the stimulated emission produces additional light photons for capture by an optical sensor. Alternatively or additionally, the production of the additional light photons may be detected electrically by monitoring the delivery of current to the disclosed devices.

In some embodiments, a scintillator region is used in the disclosed devices and systems as a waveguide material. For example, the scintillator material may be configured as a waveguide in a Q-switched laser arrangement in the disclosed devices and systems.

In some embodiments, the disclosed detectors may be configured with one or more modulators or other regions to lower the quality factor (Q) of a cavity or other medium in which the light is propagating. For example, one or more aspects of the modulator(s) may be configured as a Q-switch. The modulator(s) may be configured as a modulation section of a Q-switch laser. Further details regarding the modulation of the quality factor (Q) in the disclosed detectors are provided below.

The disclosed devices and systems may be useful in a wide variety of imaging applications. For example, the disclosed devices are well suited for use in a variety of radiation detection applications, including PET, time-of-flight PET, single-photon emission computed tomography (SPECT), X-ray CT, mammography, and other medical diagnostic systems, as well as security (e.g., homeland security) and other screening, well logging industry, space exploration, and military applications. Although described below in connection with PET systems, the configuration of the imaging system may vary. For example, the disclosed detectors may be integrated into a SPECT imaging system. The disclosed devices and systems may be used in other nuclear medicine tomography systems. Still other example applications may include multiple scanners in, for instance, a multi-modal imaging system, such as a magnetic resonance (MR)-PET system.

One or more aspects of the disclosed devices and systems may be used in a time-of-flight PET imaging system. For instance, timing information for the incident ionizing radiation may be extracted by capturing and analyzing the optically amplified light pulse and/or the light generated by the scintillator. The disclosed detectors are not limited to use in any particular type of PET system, and may be used in PET systems other than time-of-flight PET systems.

The disclosed devices and systems may be configured to detect various types of ionizing radiation. The disclosed detectors and systems are not limited to detecting gamma radiation.

FIG. 1 depicts a device 10 configured to detect ionizing radiation. The device 10 includes a detector unit 12 configured to interact with the ionizing radiation and generate an output representative of each interaction, or instance of the ionizing radiation. The clarity and quality of the output may be improved via optical amplification provided by the detector unit 12. The detector unit 12 includes a number of regions operable to develop the output representative of each instance of the ionizing radiation. In this example, the detector unit 12 includes a radiation interaction region 14, an optical gain medium region 16, and a modulator or modulation region 18 disposed between a pair of reflectors or mirrors 20. The regions 14, 16, 18 may form a resonance cavity between the pair of reflectors 20. The optical gain medium region 16 is in optical communication with the radiation interaction region 14 and configured to amplify any emission from the radiation interaction region 14 to facilitate the detection of the ionizing radiation. In this example, the radiation interaction region 14 is positioned adjacent the optical gain medium region 16.

The radiation interaction region 14 is configured to emit or generate light in response to an interaction depicted schematically at 22 with incident ionizing radiation 24, such as a gamma photon. In some embodiments, the radiation interaction region 14 includes one or more scintillation materials. Examples of suitable scintillator crystals include LSO, GSO, LuAP, YSO, BGO, LFS, NAI, CSI, and LGSO. The scintillation material may include an organic compound, an inorganic compound, or a combination of organic and inorganic compound. Such compounds or materials of the radiation interaction region 14 may be in a crystalline, polycrystalline, ceramic, powder, glass, or other form or composition. Such compounds or materials of the radiation interaction region 14 may be in a solid, liquid, or gaseous state. The scintillation material may be selected or configured for emission at a wavelength compatible with the optical gain medium region 16, as described below. The optical gain medium region 16 may alternatively be configured such that the wavelengths are compatible. Alternatively or additionally, the radiation interaction region 14 includes a material configured to generate Cherenkov radiation in response to the interaction 22 with the ionizing radiation 24.

The Cherenkov radiation, scintillation light, or other emission generated in the radiation interaction region 14 is schematically shown at 26. The emission 26 is depicted as arising from the interaction 22 via a charge carrier transition from an excited state to a ground state. The radiation interaction region 14 may be configured as a waveguide to direct the emission 26 toward the optical gain medium region 16. For example, the radiation interaction region 14 may include a number of reflective surfaces along lateral sides thereof. The manner in which the radiation interaction region 14 is operable as a gamma-activated waveguide may vary. The manner in which the radiation interaction region 14 is optically coupled to the resonant cavity may also vary. Coupling films or other media may be used to minimize differences in refractive index.

In some embodiments, the scintillator or other material(s) in the radiation interaction region 14 may be configured to produce very fast pulses. For example, the pulses may have a decay time on the order of picoseconds or in a range from picoseconds through a couple of nanoseconds. The scintillation pulses may be the result of core-to-valence transitions in the scintillator material. Examples of such scintillator materials are $BaF_2$, $KF$, $KLuF_4$, and $BaLiF_3$. The scintillation pulses may alternatively be the result of charge transfer transitions. Examples of such scintillator materials are CuI and YAP:Yb. Alternative or additional optical transition mechanisms in the scintillator materials may be applicable. Other scintillator materials may thus be used. The composition of the scintillator material may also be modified such that the wavelength of the scintillator light matches the wavelength of the emission wavelength of the optical gain medium region 16.

Optical coupling of the radiation interaction region 14 and the gain medium region 16 allows the scintillation light photon(s) to enhance the effects of spontaneous emission of photons in the gain medium region 16. Such enhancement temporarily overcomes the losses (e.g., absorption) introduced via the modulation region 18. As a result, in this example, a forced laser emission occurs from rapid depopulation of a higher energy state in the optical gain medium region 16. In this example, the optical amplification is operable as a Q-switch system. The very low intensity, fast emissions in the scintillator material (or other material of the radiation interaction region 14) are thus optically amplified. The resulting amplified optical pulse may also thus have very good correlation with the scintillator (or other) response to the ionizing radiation.

The optical gain medium region 16 is configured to reach a state of population inversion to facilitate the amplification of the emission 26. The population inversion is achieved via the storage of energy provided by an energy source in communication with the detector unit 12. In this example, the energy source includes a pump laser 28 or other light source coupled to the optical gain medium region 16 to optically pump the optical gain medium region 16. The pump laser 28 is configured to maintain a state of population inversion in the optical gain medium region 16. The population inversion is schematically shown at 30 as optical pumping via absorption. The pump laser 28 may direct an optical signal 32 at the optical gain medium region 16 for absorption therein. The manner in which the optical signal 32 is generated, directed or otherwise provided to the optical gain medium region 16 may vary.

The optical gain medium region 16 may be configured as one or more optical amplifiers. For example, the optical gain medium region 16 may include multiple optical amplifiers arranged in an array. The optical amplifier or optical amplifier array is configured for operation as a laser within the resonance cavity formed between the pair of reflectors 20. For example, the optical gain medium region 16 may include a semiconductor laser structure. The material, type, construction, configuration, and other characteristics of the optical gain medium region 16 may vary.

The modulation region 18 is configured to provide losses (e.g., absorption) such that lasing, or laser action, is not attained due to the energy provided by the pump laser 28 alone. The modulation region 18 is constructed to lower the quality factor (Q) of the resonant cavity in which the optical gain medium region 16 is disposed. The resonant cavity is thus configured such that spontaneous laser action in the absence of the scintillation emission 26 is prohibited or minimized. For example, the modulation region 18 is positioned to block one of the reflectors 20. Such positioning inhibits the resonance within the resonant cavity, such that energy builds up in a population inversion of charge carriers. For example, the population inversion results in electrons reaching an excited state. The population inversion remains until the modulation is overcome. In the example of FIG. 1, the modulation is effectively removed or overcome via the addition of the energy from the scintillation light emission 26. The device 10 may thus be configured such that a few photons of the scintillation light emission 26 stimulate the generation of the amplified light pulse (e.g., laser amplification). The stored energy may thus be emitted in an amplified pulse. The detector unit 12 may be considered to have switched to a transmission mode. The duration of the amplified pulse may depend on multiple parameters, including, for instance, the length of the resonant cavity (e.g., the collective length of the regions 14, 16, and 18 in this example) and any output coupling, the repetition rate, and the energy provided by the pump laser 28.

The pump laser 28 may thus maintain the population inversion until the interaction with the ionizing radiation introduces additional energy via the emission 26. The additional energy is sufficient to stimulate laser action. In this example, the optical gain medium region 16 generates an optical pulse schematically shown at 34 in response to the emission 26 from the radiation interaction region 14, thereby amplifying the emission 26 generated by the interaction 22 with the ionizing radiation 24. The modulation region 18 may thus be configured to control the conditions under which such optical amplification occurs.

The scintillation light emission 26 effectively changes the absorption rate or other modulating effect(s) of the modulation region 18. These changes may be alternatively or additionally achieved by external factors influencing the modulation region 18, such as an applied voltage and optical bleaching effects. The effective decrease in the absorption may thus lead to the generation of an ultrafast, high intensity pulse.

The modulation may be achieved via different types of modulators or modulation techniques. The modulation may be provided mechanically (e.g., via placement or removal of an object, such as a mirror, in the resonant cavity), acousto-optically (e.g., via diffraction of the light travelling in the resonant cavity, thereby reducing feedback provided by the reflectors 20), electro-optically (e.g., via polarization of the light travelling in the resonant cavity, including, for instance, removal of the polarization via a polarizer), or optically (e.g., via absorption media, such as dyes). In some examples, the modulation is achieved in the manner provided in Q-switched lasers, including, for instance, the Cr:YAG modulators in Nd:YAG lasers used in various surface modification applications, including paint stripping, decontamination, and surface sterilization. The modulation may be configured to provide micro-burst pulses, such as those generated by Q-switched lasers used in medical (e.g., surgical) procedures. The pulses generated as a result of the modulation may have short widths (e.g., ultrashort pulse widths in the picosecond or femtosecond ranges) and, thus, high power (e.g., intensity). The bursts or pulses generated as a result of the modulation in the disclosed detectors may vary from those generated in these Q-switched laser applications.

In these and other ways, the modulation of the quality factor (Q) of the resonant cavity is used to control when the optical amplification of the scintillation light occurs. Such amplification need not be provided via Q-switching, as described herein. The modulator need not be positioned to block one of the reflectors 20, as shown in the example of FIG. 1.

The modulation region 18 may be integrated with one or more of the other regions of the detector unit 12 to any desired extent. The modulation region 18 thus need not be a distinct region of the detector unit 12 as shown. For example, a modulator or other aspect or component of the modulation region 18 may be integrated into the optical gain medium region 16.

The optical gain medium region 16 has an emission wavelength that corresponds with a wavelength of the emission 26 generated by the radiation interaction region 14. For example, the wavelength of the optical pulse 34 may match the wavelength of the emission 26. In some cases, the wavelengths need not match exactly. An overlap between the optical spectra of the emission 26 and the emission of the optical gain medium region 16 may be suitably efficient. In one embodiment, the optical gain medium region 16 may be configured as a semiconductor laser structure having a band gap such that the emission wavelength of the optical gain medium region matches the wavelength of the light generated by the interaction region. For example, the semiconductor laser structure may include a super-lattice structure having a composition that establishes the energy band-gap that achieves the wavelength match between the emission 26 and the optical pulse 34. The super-lattice structure may include various semiconductor material combinations, such as Group III-V, Group II-VI, and Group IV-VI compounds, including, for example, quantum cascade laser structures fabricated using Group III-V compounds, such as InP, InGasAsP, InGaN, AlGaAsSb, etc. The emission 26 may thus overcome the losses (e.g., absorptions) introduced in the resonance cavity by the modulation region 18.

In the example of FIG. 1, the device 10 includes an optical sensor 36 to capture or detect the optical pulse 34. The optical sensor 36 may be positioned at an end or other surface of the detector unit 12 for optical communication with the detector unit 12. The radiation interaction region 14 and other regions of the detector unit 12 may be configured as a waveguide to direct the optical pulse 34 toward the end or surface of the detector unit 12. One of the mirrors 20 (and/or other end or surface of the detector unit 12) may be semitransparent or otherwise configured to allow a fraction of the light to leave the resonant cavity. In one example, the optical sensor 36 may be mounted on the end or surface of the detector unit 12. Alternatively, the optical sensor 36 is an integral part of the detector unit 12. The manner in which the optical sensor 36 is coupled to, or in communication with, the waveguide in which the emission 26 and the pulse 34 travel may vary.

The optical sensor 36 may include any number of photomultipliers, silicon photomultipliers, PIN diodes, or drift diodes. A variety of optical detection techniques, systems or devices may be used, such as optical logical switches performing Boolean logic functions such as XOR, OR, AND, INVERT, etc. The construction, type, configuration, arrangement of the optical sensor 36 may vary.

The population inversion need not be established via optical pumping. As described below, the energy to reach the state of population inversion may be provided by other types of sources. For example, the population inversion may be achieved electrically. As described below, delivery of external charge carriers to the optical gain medium region 16 may establish and maintain the state of population inversion.

The device 10 may include a processor 38 to determine information regarding the incident ionizing radiation. For example, the information may be indicative of the timing of the interaction and/or the energy of the ionizing radiation, as described below. The optical sensor 36 may be coupled to, or in communication with, the processor 38 to receive an electrical signal indicative of the optical pulse(s) captured by the optical sensor 36.

The radiation interaction region 14 need not be adjacent to the optical gain medium region 16 as shown. In other examples, the radiation interaction region 14 is optically coupled to, or otherwise in optical communication with, the optical gain medium region 16 via one or more other components of the device 10. For instance, the radiation interaction region 14 and the optical gain medium region 16 may be coupled via one or more optical fibers.

The shape of the radiation interaction region 14 may also vary. The radiation interaction region 14 need not be shaped as a block as shown, and need not have a cross-section similar to the other components or regions of the detector unit 12. For example, the radiation interaction region 14 may be constructed as a fiber, or be otherwise elongate. The radiation interaction region 14 may be shaped as any type of radiation-activated waveguide. In one embodiment, the radiation interaction 14 may be shaped as a ring. The ring may be disposed around the source of the ionizing radiation. The ring may have two ends at which respective optical sensors are optically coupled to the radiation interaction region 14. The location of the radiation interaction along the ring may be determined via a comparison of the timing information provided by the amplified optical pulses received at each detector. An array of such rings may be used in an imaging system.

The modulator 18 and the optical gain medium region 16 may be fabricated monolithically. In some embodiments, the modulator 18 and the optical gain medium region 16 may have the same material composition, or include one or more common materials. The band gap in the optical gain medium region 16 may be shifted to lower energies to prevent direct band-to-band absorption and to increase the modulation effectiveness. The band shift may be achieved by co-doping or via a configuration that implements a carrier-induced band shrinkage effect. For example, the band edge may be shifted in the modulator 18 using Franz-Keldysh or quantum confined Stark effects under an applied electric field. These effects may enhance the absorption at the band edge. Changing the absorption rate by modulation of the electric field is one example of a mechanism that may be implemented for generation of the photon burst.

FIGS. 2-5 depict further embodiments of gamma-activated detection devices with optical amplification. Elements in common with FIG. 1 are identified by common reference numerals. Each example may be configured with a scintillation material (e.g., as a scintillation photomultiplier) or an interaction material configured to generate Cherenkov radiation (e.g., as a Cherenkov radiation photomultiplier). The detector units of these embodiments achieve optical amplification via various open cavity configurations. In these embodiments, modulation or other losses may be integrated into one or more of the regions, e.g., the optical gain medium regions, to prevent the generation of spurious amplified signals.

In one or more of these embodiments, the device is configured to amplify the first photons of the scintillation pulse. This configuration may be useful in time-of-flight PET and other applications. For example, the amplification of the first photons may be useful for improving the resolution of coincidence timing determinations. The devices described herein may improve the rise time, decay time, and light intensity of the optical signal being detected. Coincidence timing resolution in PET systems may depend strongly on rise time, decay time and light output. A shorter rise time, a shorter decay time, and/or a higher light output may improve the timing resolution. Improvements in timing resolution of TOF PET system may thus be achieved through the generation of an increased number of photons during the first picoseconds of the scintillation pulse. These photons are generated in the optical gain medium upon the stimulated emission resulting from the scintillation photons, as described above.

The embodiments described below also exemplify alternative sensing techniques. The amplified light pulses may be detected by optical sensors as described above. The amplified light pulses may alternatively or additionally be detected electronically by monitoring the activity of optical amplifiers in the optical gain medium region(s). For example, the detector electronics can detect the gamma interaction event based on the fact that the optical amplifier releases the energy stored in the population inversion. As a result, the amplification is detected and, thus, the radiation interaction can be detected without a need to detect the amplified light.

Figure 2:
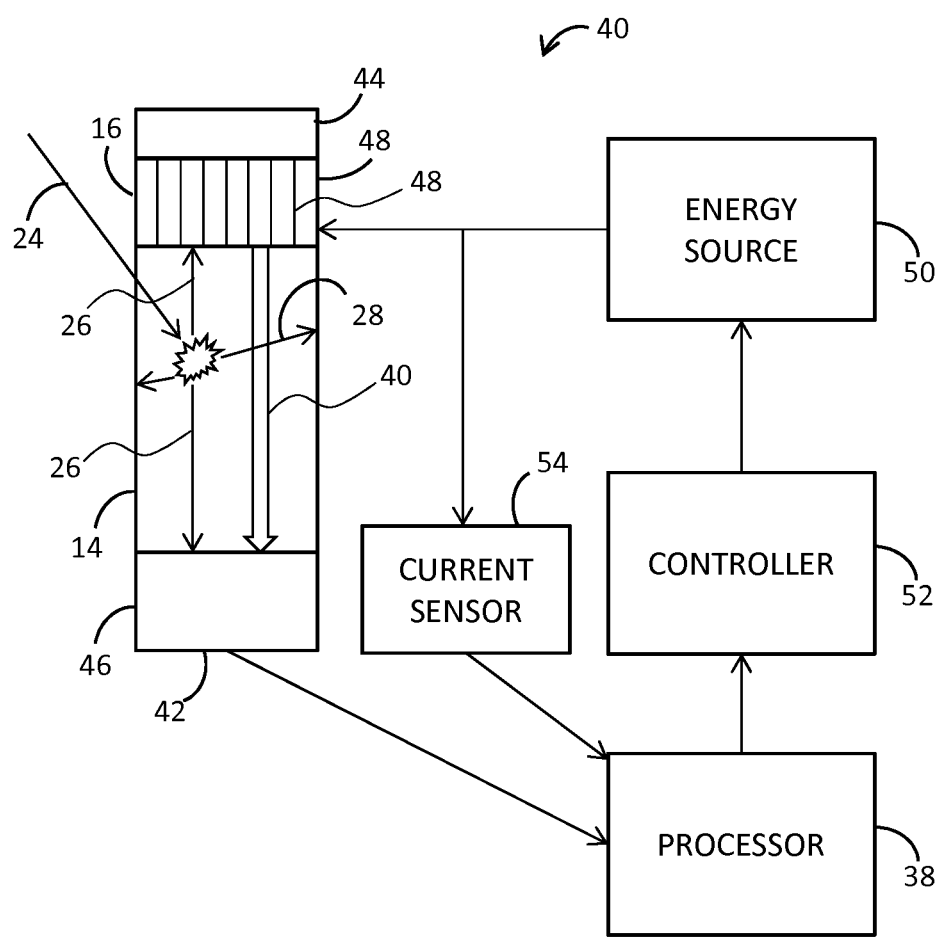
FIG. 2 is a schematic diagram of a radiation detector with an electrically pumped gain medium region for optical amplification according to one embodiment.

FIG. 2 depicts a device 40 with a detector unit 42 having an open cavity configuration. The detector 42 includes a single reflector 44, such as a mirror. The reflector 44 is disposed on one end of the detector unit 42, which includes an optical sensor 46 disposed at the opposite end. The optical sensor 46 may include any number of photomultipliers, avalanche photodiodes, or other photodetectors or optical switches. The reflector 44 and the optical sensor 46 may be adjacent the optical gain medium region 16 and the radiation interaction region 14, respectively, as shown, although alternative arrangements may be used.

The optical gain medium region 16 in this example includes an array of optical amplifiers 48. For example, each optical amplifier 48 may include a semiconductor optical amplifier (SOA). Any current or hereafter developed optical amplifier design, configuration, or arrangement may be used.

The device 40 also includes an energy source 50 to maintain the population inversion in the optical gain medium region 16. In this example, the energy source 50 includes an electrical energy source to deliver charge carriers to the optical gain medium region 16. The energy source 50 may thus be configured as a current source. Delivery of the charge carriers by the energy source 50 need not be automatic or implemented continuously. In this example, the energy source is controlled by a controller 52 of the device 40. The controller 52 is coupled to the energy source 50 and configured to determine when and/or to what extent the population inversion is maintained. For example, the controller 52 may delay the replenishment of charge carriers after the depopulation, as described below. The controller 52 may thus establish a quiescence time period after amplification of the light (e.g., generation of the amplified pulse 34), during which the state of population inversion is not yet restored to a level operative for amplification of further scintillation light emissions. The quiescence time period may be set to avoid or minimize pileup issues or other complications arising from overlapping consecutive signals initiated by different detection events. The controller 52 may be integrated with the processor 38 to any desired extent. For example, the processor 38 may include an application specific integrated circuit (ASIC) or other system on a chip including a variety of analog and digital modules to support functions in addition to data processing.

The output of the energy source may be monitored by a current sensor 54 of the device 40. In this example, the current sensor 54 provides an additional or alternative mechanism for detecting the radiation interaction. The presence of current flow from the energy source 50 to the optical amplifiers 48 of the optical gain medium region 16 may be used as an indication of the radiation interaction. The current sensor 54 may be configured to develop an output signal for the processor 38 indicative of the current level or the presence of current. In one example, the processor 38 may be coupled to the current sensor 54 to detect the interaction based on the detected current level. The current sensor 54 be integrated with the processor 38 to any desired extent.

In the example shown in FIG. 2, the optical gain medium 16 is positioned on or near a surface of the detector unit 42 through which the gamma photon 24 may enter. As a result of the absorption of the gamma photon 24, the scintillator or other material of the radiation interaction region 14 emits the light 26. The light 26 generated in the first picoseconds of the scintillation reaches the optical gain medium region 16, which is in a state of population inversion. These first scintillation photons of the light 26 trigger an avalanche of photons in the optical pulse 34. The reflector 44, which may be positioned on the optical gain medium region 16, directs the generated photons of the optical pulse 34 toward the optical sensor 46.

In this example, the overall response of the device 40 to the ionizing radiation may include two signal components. The first component may include the light 26 from, for instance, a scintillation pulse. The light 26 may have a relatively slow rise time and an even slower decay time. The second component is the optical pulse 34, which has very fast rise and decay times (e.g., relative to rise and decay times of the light 26) and high intensity (e.g., relative to the light 26). Such improvements may be useful in imaging systems (e.g., PET imaging systems) in which the resolution of coincidence timing determinations is strongly dependent on fast and high intensity components of the emitted light.

The amplification process may be limited only to the interaction of the optical gain medium region 16 with the very first scintillation photons or with all photons generated during a respective scintillation event. In one example, the controller 52 may be configured to select a particular range of interaction between the radiation interaction region 14 (e.g., the scintillator) and the optical gain medium region 16. The interaction range may be set based on an adjustment or customization of the restoration of the population inversion after each amplification. The controller 52 may control the length of the time period after which the optical gain medium region 16 is ready for amplification of further scintillation photons.

The controller 52 and/or the processor 38 may be configured to control the interaction range, time period, or other aspect determinative of when the amplification may occur, based on feedback from the detector unit 42. In this example, the processor 38 may receive an indication from the optical sensor 46 regarding the amount of light emitted in the detector unit 42. Thus, in one example, operation of the device 40 proceeds in the following sequence: (i) interaction with gamma or other ionizing radiation, (ii) initial scintillation photons generated, (iii) the optical gain medium 16 amplifies the scintillator photons, (iv) light is detected in the optical sensor 46, (v) power is sent to the optical gain medium region 16 to restore population inversion, and (vi) the device 40 is ready for the next interaction with the gamma radiation. In that and other examples, the optical sensor 46 may be configured as an optical switch, which may be triggered by the light generated in the detector unit 42.

Figure 3:
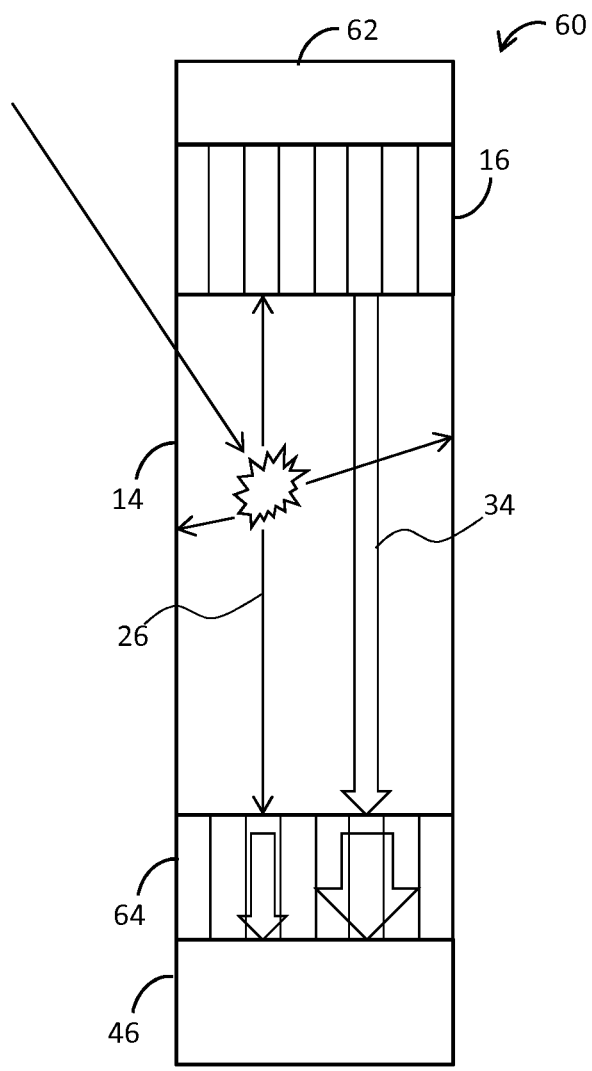
FIG. 3 is a schematic diagram of a radiation detector with multiple electrically pumped gain medium regions for optical amplification according to one embodiment.

FIG. 3 depicts another example device 60 for detecting ionizing radiation via optical amplification. In this embodiment, the optical amplification is supported by multiple optical gain medium regions. The device 60 includes a detector unit 62 having a further optical gain medium region 64 in addition to the optical gain medium region 16. The optical gain medium region 64 may be disposed between the radiation interaction region 14 and the optical sensor 46. Placement of the optical gain medium region 64 in front of, or adjacent to, the optical sensor 46 allows any photon generated in the detector unit 62 to be amplified. For instance, both the light emission 26 generated in the radiation interaction region 14 (e.g., scintillator light) and the amplified optical pulse 34 generated in the optical gain medium region 16 eventually pass through the optical gain medium region 64. Secondary or further amplification is thus triggered. Information regarding the radiation interaction may nonetheless be provided by a current sensor, as described above.

The optical gain medium region 64 may be configured with an array of optical amplifiers, as described above. Alternatively or additionally, the optical gain medium region 64 may be integrated with the optical sensor 46. The optical sensor 46 may also be configured to support the control of the interaction range by detector control electronics, such as a processing and control unit having a controller and/or processor as described above. Energy may be provided to the optical gain medium region 64 by the energy source that supports the optical gain medium region 16 (see, e.g., energy source 50 of FIG. 2) or by a separate, dedicated energy source.

Figure 4:
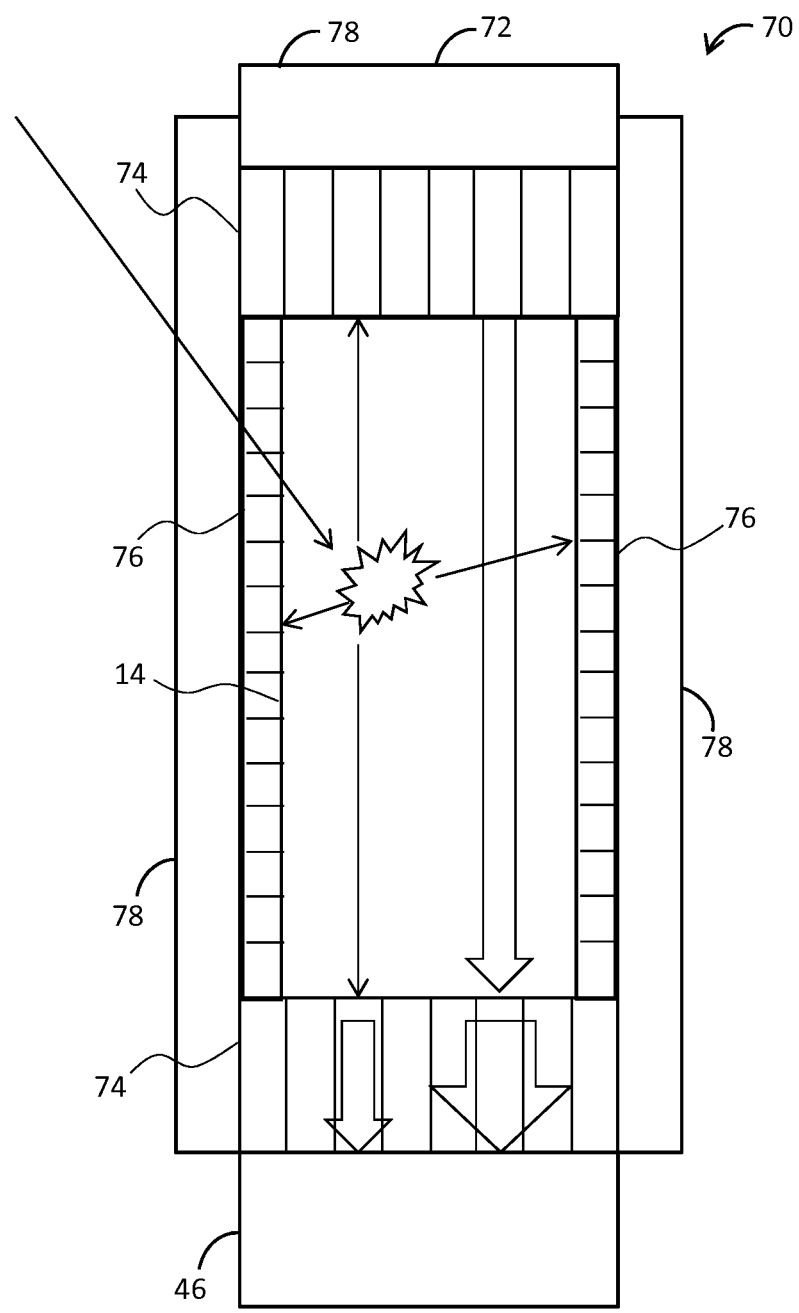
FIG. 4 is a schematic diagram of another radiation detector with multiple electrically pumped gain medium regions for optical amplification according to another embodiment.

FIG. 4 depicts a device 70 having a detector unit 72 with still further optical gain medium regions. The device 70 may be otherwise configured in a manner similar to one or more of the above-described embodiments. For example, the device 70 may include a processor, controller, and other detection electronics for analyzing the information provided by a current sensor and/or an optical sensor, and/or for controlling one or more energy sources. This embodiment differs from the above-described devices in that each surface or side of the radiation interaction region 14 is covered by, or adjacent to, a respective optical gain medium region. For example, the detector unit 72 includes a pair of optical gain medium regions 74 along opposite ends (or end faces) of the radiation interaction region 14 as well as further gain medium regions 76 along each lateral face or side of the radiation interaction region 14. Together, the optical gain medium regions 74 and 76 effectively surround the radiation interaction region 14. The optical gain medium regions 74 and 76 are depicted as separate regions, but may be considered or integrated as a single region. Any number of optical amplifiers may be integrated in the single region.

The optical sensor 46 may be disposed along one side or surface of the radiation interaction region 14 as described above. For example, the optical sensor 46 may be positioned along or near an end surface of the radiation interaction region 14.

The detector unit 72 includes a set of reflectors 78 on or along each side or surface other than the end surface at which the optical sensor 46 is disposed. In one example, the reflectors 78 cover five sides of the radiation interaction region 14. The reflectors 78 thus direct the amplified optical pulses generated by the various optical gain media to the optical sensor 46. This configuration provides multiple optical amplifications of the photons, which may maximize the optical amplification. Maximizing the optical amplification of the scintillator light may be useful in connection with scintillators, scintillator materials, or other materials that have relatively low light output.

The detector units of the disclosed devices need not be shaped as an elongated block as shown in FIGS. 1-4. In some cases, the radiation interaction region of the detector unit may be elongate or otherwise have a depth (the dimension generally aligned with the incident radiation) suitable for ensuring interaction with the radiation. The size or shape of the detector units in the dimensions generally transverse to the incident radiation (e.g., width or height) may vary. For example, the detector size in the other dimensions may be selected or configured to support a desired degree of resolution provided by a detector array or other arrangement of multiple detector devices. Each detector unit may, in some cases, be arranged in a detector block of detector units that shares one or more components of the above-described devices, e.g., a processor, an optical sensor, etc. Multiple detector blocks may, in turn, be arranged in a detector cassette of an imaging system to support further component sharing, integration, etc.

Figure 5:
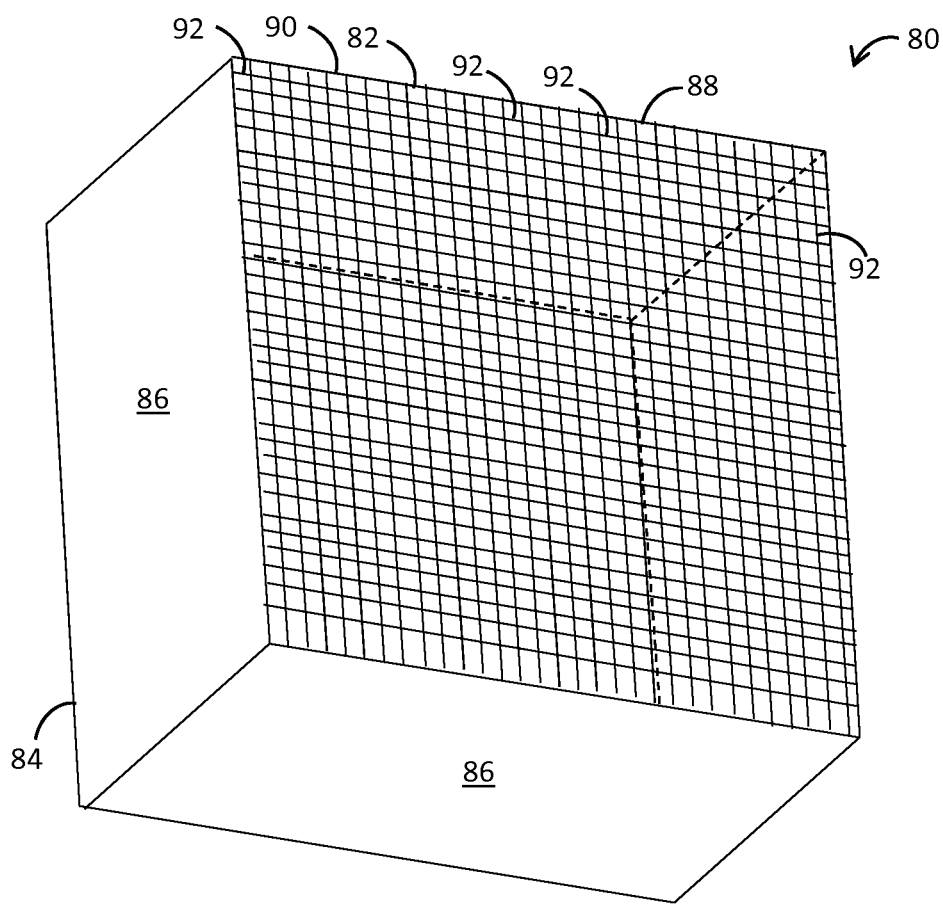
FIG. 5 is a schematic diagram of a radiation detector with a monolithic radiation interaction block having pixelated gain medium regions disposed along multiple sides for optical amplification according to one embodiment.

FIG. 5 depicts a device 80 with a detector unit 82 having a different construction and shape than the above-described embodiments. In this example, the detector unit 82 includes a monolithic block 84 of scintillator crystal or other radiation interaction material. Rather than split the monolithic block 84 into individual detectors each having a respective scintillation or other radiation interaction region (thereby forming an array of the detector devices described above), the radiation interaction region of the monolithic block 84 is shared by an array of optical or other sensors. The monolithic block 84 is configured with two different types of surfaces. One type is light absorbing, while the other type is light sensing. The light absorbing surfaces prevent light reflections from occurring within the monolithic block 84 after the light is generated by a radiation interaction event.

In this example, the monolithic block 84 includes a set of light-absorbing orthogonal surfaces 86 and a set of active orthogonal surfaces 88. In this example, each set 86, 88 includes three orthogonal surfaces. One of the active orthogonal surfaces 88, and two of the light-absorbing orthogonal surfaces, are visible in FIG. 5. Each active orthogonal surface 88 has a respective array of optical pixel assemblies 90, forming a pixelated optical gain medium region arranged thereon. Each optical pixel assembly 90 (i.e., each "pixel") includes an optical gain medium region (e.g., one or more optical amplifiers) and an optical sensor.

Adjacent pixels 90 in the array are separated by septa 92. The septa 92 may extend the length of each lateral side of each pixel assembly 90. Each septum 92 is light absorbing so that scintillation light emitted at a specific location in the monolithic block 84 is amplified only by selected optical gain amplifiers in the arrays on the active orthogonal surfaces 88. If the specific location of the gamma absorption point in the monolithic block 84 is at coordinates (x, y, z), then the scintillation light generated in the monolithic block 84 only reaches optical amplifiers in the pixel positions on each surface 88 corresponding to one of the locations (x,y), (y,z), or (x,z). The scintillation photons that approach the pixel assemblies 90 of the surface 88 at an angle sufficiently offset from orthogonal are absorbed by the septa 92. If the scintillation photons approach the surface 88 orthogonally (or sufficiently near orthogonal), the scintillation photons reach the optical amplifier of the pixel assembly 90, thereby triggering optical amplification as described above. An amplified optical pulse (e.g., an avalanche of photons) is then captured by the optical sensor of the pixel assembly 90. In some cases, the septa 92 may extend beyond the lateral sides of the pixel assembly 90 or be otherwise elongated to ensure this pixel selectivity.

The optical amplifier and optical sensor of each pixel assembly 90 may be constructed as described above. The construction, configuration, type, and other characteristics of the pixel assemblies 90 may vary. For example, the optical sensor of each pixel assembly 90 may be configured as an optical switch (e.g., photodiode) rather than as a photosensor capable of generating detailed information regarding the captured pulse.

A processor of the device 80 is coupled to or otherwise in communication with the optical sensors of the pixel array to monitor which optical amplifiers are triggered (e.g., the restoration current sensing approach described above) and/or which corresponding optical sensors detect an amplified optical pulse (e.g., the optical sensor approach described above). Through such monitoring, the device 80 can detect the exact location of the gamma absorption event (x, y, z). The three coordinates may be useful in supporting coincidence timing determinations (e.g., with improved resolution), including, for instance, those determinations made in time-of-flight PET systems. For example, the three coordinates may also be useful in determining depth of interaction (DOI) information for the radiation interaction event. Such DOI information may be used in the time-of-flight determinations.

Energy information may also be extracted from the coordinate information. For example, the monolithic block 84 may be configured such that the radiation interaction event occurs for radiation exceeding an energy threshold and/or failing within a range of energies. The monolithic block 84 may accordingly include one or more materials having respective energy thresholds or ranges for the interaction event, as described below in connection with Cherenkov radiation embodiments. In scintillation embodiments, the energy range or window may be estimated based on the position of a photopeak. The photopeak position may be indicative of the entire energy of the incident gamma photon being deposited in the material of the monolithic block 84 (e.g., no Compton losses). In these and other ways, the location of the radiation interaction event may thus be used to extract the energy information.

Energy information may be used to qualify gamma events. Such qualification may be based on the total amount of energy deposited in the radiation interaction medium. Event qualification may be implemented in conjunction with any of the detector embodiments described herein, including those directed to detecting Cherenkov radiation. In Cherenkov radiation embodiments, the event qualification may be implemented via the Cherenkov radiation threshold (e.g., energy deposited below the threshold does not produce Cherenkov radiation), as described further below.

In scintillation embodiments, the event qualification may be implemented by determining the amount of light produced by the radiation interaction medium. The determination may distinguish between cases when (1) some of the gamma energy escapes from the medium (e.g., Compton scattering) or is otherwise lost or absorbed in another portion of the detector and (2) all of the energy of the incident gamma photon is deposited in the radiation interaction medium. The former cases may be excluded from imaging reconstruction as non-qualified events because, for instance, a line of response determination may not be accurate. The events remaining for image reconstruction are those events that have relatively well-defined lines of response.

In one example embodiment, the radiation interaction medium may include a scintillator material that produces two types of emissions in response to the incident gamma radiation. These emissions may be correlated with the same gamma absorption event. For example, $BaF_2$ may be used in the radiation interaction medium to produce an emission spectrum with a cross-to-valence emission at a maximum wavelength in a range from about 195 to 220 nm, and with an excitonic emission with a maximum wavelength of about 300 nm. The cross-to-valence emission may be used for light amplification (e.g., via tuning to the spectral range of the light amplification medium, as described herein), while the excitonic emission is used for energy qualification. The amplified light may then be used for time signature purposes, insofar as such light may correspond with the initial interaction between the gamma photon and the radiation interaction medium. The excitonic emission may then be used to evaluate the total amount of energy deposited in the radiation interaction medium and thereby qualify the gamma event. The radiation interaction medium and the light amplification medium (e.g., optical amplifier) may be configured such that the excitonic emission falls outside of the sensitive range of the light amplification medium. In some examples, the excitonic emission may be detected independently of the amplified light via a separate optical sensor. The scintillation material may vary. Other examples may include KF, $KluF_4$, and $BaLi F_3$.

Further details are now provided regarding embodiments of the disclosed devices in which the optical amplification is applied to Cherenkov radiation. Each of the radiation interaction regions of the example devices described above may include a material configured to generate Cherenkov radiation upon interaction with the incident ionizing radiation (e.g., a gamma photon).

In some embodiments, the radiation interaction region is then configured not to generate any scintillation light that may otherwise interfere with the Cherenkov signal. In other embodiments, the radiation interaction region may generate scintillation light with a very low intensity. Examples of such materials include $PbF_2$ and $PbWO_4$.

The detector devices may be otherwise configured similarly to those example devices described above. The Cherenkov light (or radiation) is emitted in the interaction region whenever the velocity of a charged particle generated by the radiation exceeds the velocity of light in the material. The Cherenkov light is then amplified by the optical amplifiers or other optical gain medium region(s) of the detector device. The optical amplification may address the generally low intensity nature of Cherenkov light.

In some embodiments, the optical gain medium region(s) may include multiple optical amplifiers directed to amplifying specific wavelength ranges of the Cherenkov radiation. The Cherenkov radiation may cover a large spectrum of wavelength. In one example, one or more arrays of optical amplifiers may be used to detect the Cherenkov radiation, each amplifier in the array being sensitive to a specific wavelength range. The full optical spectrum of the Cherenkov light may thus be covered. For example, the array may include three optical amplifiers sensitive in the blue (and/or UV), green and red parts of the spectrum. The Cherenkov light introduced to each such optical amplifier triggers the amplification based on the stimulated emission as described above.

The Cherenkov light amplification may also provide energy discrimination information. Cherenkov light is emitted above a certain energy threshold based on the refractive index of the interaction material. The detector devices may thus provide an indication of the energy of the incident radiation. Energy discrimination processing may be incorporated into the detector signal processing. For example, a detector device may include multiple interaction regions of varying refractive index, in which case the energy of the incident radiation can be bracketed or approximated.

Moreover, the characteristic properties of Cherenkov radiation as related to its special direction versus the direction of the moving charge particles allows one to extract additional information about the amount of energy deposited in the material. For instance, an energy range or window may be determined based on the threshold established by the property or characteristic of the material selected for the detector.

Another advantage of generating Cherenkov radiation in the disclosed detector devices and systems involves the very short decay time (e.g., on the order of a few picoseconds) of Cherenkov radiation. The short time of the emission may be useful, for instance, in time-of-flight PET imaging systems and other application where timing coincidence is used.

The optical amplification of the Cherenkov radiation increases the intensity of the Cherenkov radiation to a level of practical use and detection. For example, without such optical amplification, the detection efficiency of Cherenkov PET systems may be less than 1%. The optical amplification may increase the detection efficiency significantly.

As described above in connection with scintillation materials, the Cherenkov radiation interaction region may be configured as a waveguide to direct the Cherenkov radiation to the optical amplifier(s). For example, the Cherenkov radiation interaction region may be configured as an optical fiber.

A variety of other waveguide geometries may be used. Alternatively or additionally, the Cherenkov radiation interaction region may be partially covered by, or otherwise in communication with, light absorbing media. Such media may be configured to eliminate the Cherenkov radiation that propagates in the material in certain undesirable directions. For example, these undesirable directions may be associated with Compton interactions of byproducts of the gamma interaction in the Cherenkov material.

One or more Cherenkov materials may be used in any of the optical amplifiers described above. For example, a Cherenkov material may be configured as an optical cavity positioned to be an integral part of an optical amplifier assembly. In this manner, the Cherenkov material may be used to avoid or minimize light losses on the interface between the radiation interaction material and the optical amplifier assembly.

One or more aspects of the optical amplification-based radiation detection described above may be integrated into a scanner or imaging system. The scanner or imaging system may be used in a wide variety of imaging applications. In medical imaging examples, the scanner or imaging system may include a PET system, such as a time-of-flight PET system.

Figure 6:
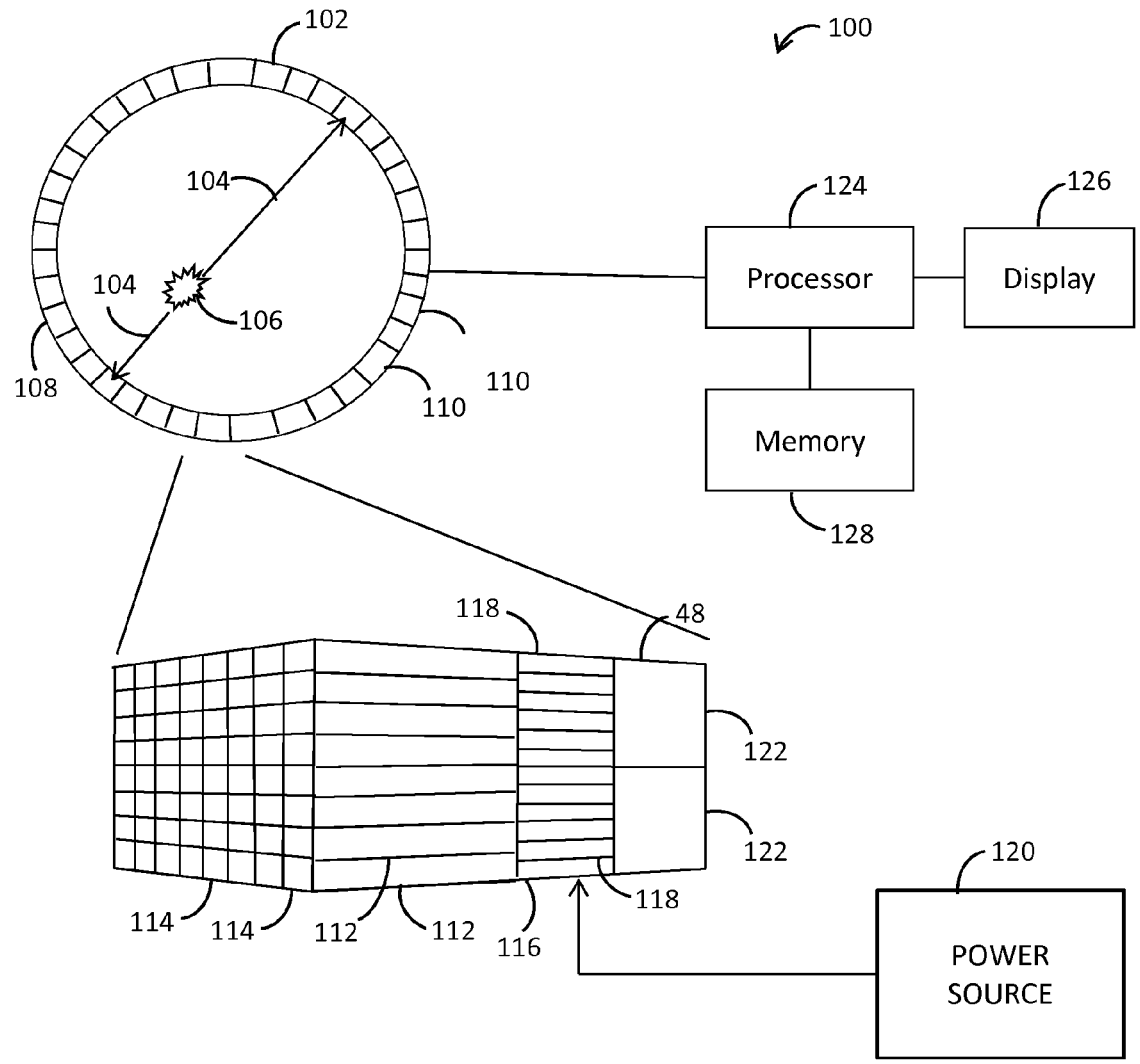
FIG. 6 is a schematic diagram of a PET system having a set of radiation detectors configured for optical amplification according to one embodiment.

FIG. 6 depicts a PET system 100 having a scanner 102 configured for optical amplification of light generated from emissions of ionizing radiation. The PET system 100 is one example of a system or context in which the above-described detector devices may be applied. The disclosed devices are not limited to applications involving medical imaging, PET imaging, or other imaging systems involving coincidence imaging. For example, the disclosed devices may be used in SPECT imaging systems, time-of-flight radar, and other applications. In this PET example, the ionizing radiation includes a pair of gamma photons 104 travelling from an annihilation site 106 in a patient. The scanner 102 includes a set 108 of detectors, which may be arranged in a ring disposed about the patient. In this example, the detectors 108 are arranged in detector blocks 110, each of which includes multiple detectors. Each detector in each detector block 110 may be configured in accordance with one or more of the above-described embodiments. In some cases, one or more features or characteristics of one of the embodiments may be combined with one or more features or characteristics of one or more of the other embodiments.

An example of one of the detector blocks 110 is shown in greater detail in FIG. 6. Each detector block 110 includes an array of radiation interaction regions 112. Each radiation interaction region 112 may include a scintillation crystal configured to generate light in response to an interaction with the ionizing radiation. Alternatively, each radiation interaction region 112 may be configured to generate Cherenkov radiation in response to interaction with the ionizing radiation. Each radiation interaction region 112 may be separated from adjacent regions 112 by reflectors, such as mirrors, or be otherwise configured to act as waveguides as described above. An end 114 of each radiation interaction region 112 may also be covered by a reflector or mirror to redirect light to an optical gain medium region 116 of the detector block 110.

In this example, the optical gain medium region 116 includes a set of optical amplifiers 118. The number of optical amplifiers 118 may correspond with the number of radiation interaction regions 112 in the detector block 110. Alternatively, the number of optical amplifiers 118 does not correspond with the number of radiation interaction regions 112. For example, in some embodiments, adjacent optical amplifiers 118 may be shared by multiple radiation interaction regions 112. Each optical amplifier 118 may be in optical communication with multiple scintillation crystals (or other radiation interaction regions) and configured to amplify the light provided thereby. Alternatively, one or more of the optical amplifiers 118 are dedicated to a respective one of the radiation interaction regions 112.

The optical amplifiers 118 are depicted schematically in FIG. 6, and may be positioned in alternative or additional locations in the detector block 110. For example, additional optical amplifiers 118 may be disposed at or near the ends 114 of the radiation interaction region 112.

The optical amplifiers 118 are coupled to a power source 120. The power source 120 may supply power (e.g., as a current source) to each detector in the array 108. The power source 120 is configured to establish a state of population inversion in each optical amplifier 118, as described above.

Each detector block 110 in this example includes a number of optical sensors 122 in optical communication with the scintillation crystal or other material(s) of the radiation interaction regions 112. Each optical amplifier 122 may be positioned to capture the amplified light from one or more of the optical amplifiers 118. In this example, the detector block 110 includes an array of four optical sensors 122, such that each optical sensor 122 may capture the amplified light from a number of the optical amplifiers 118. Alternatively, the number of optical sensors 122 may correspond with the number of optical amplifiers 118 and/or the number of radiation interaction regions 112. In some embodiments, the detector blocks need not use optical sensors to detect the amplified light, as described above.

The PET system 100 includes a processor 124 coupled to, or otherwise in communication with, the detector array 108 to generate scan data based on the interaction with the ionizing radiation. The processor 124 may include a coincidence processor. The processor 124 may be configured to detect coincidence events based on multiple interactions with the ionizing radiation in respective pairs of detectors of the set of detectors. The coincidence determination may include time-of-flight analysis and depth of interaction information analysis.

In some examples, such as PET examples, the processor 124 may be coupled to, or otherwise in communication with, the optical sensors 122 to receive signals indicative of the amplified light captured by the optical sensors 122. Alternatively or additionally, each detector block 110 may include one or more current sensors as described above to generate an indication of current provided by the power source 120 to one or more of the optical amplifiers 122 of the detector block 110 to recover the state of population inversion depleted upon the interaction. The processor 124 may thus be configured to generate the scan data based on the indication of the current.

In this PET-based exemplary application, the processor 124 may provide data acquisition and image processing functions of the PET system 100. The processor 124 may include more than one module, processor or processing device, such as a computer, server, digital signal processor (DSP), ASIC, etc., to implement such functions. The data acquisition module (or other component) of the processor 124 may use spatial coordinate signals to produce scan data to the image processing module (or other component). The processor 124 may thus render, for example, an image of tracer distribution in the patient on a display 126.

Additional, different, or fewer components may be provided in the PET system 100. The system 100 may include more than one imaging system or subsystem. For example, the system 100 may include magnetic resonance imaging (MRI), computed tomography (CT), or other imaging or scanner components. Other parts of the system 100 may include power supplies, communications systems, image processing systems, tomography generation systems, patient handling systems, and user interface systems.

Further details regarding exemplary PET detector configurations and components suitable for use with the disclosed devices and systems are set forth in U.S. Patent Publication No. 2011/0192982 ("System and Method for Providing Depth of Interaction Detection Using Positron Emission Tomography"), the entire disclosure of which is hereby incorporated by reference.

In operation, the signals from the detector array 108 are processed to identify specific events. The timing and location information are used to determine the existence of a valid event (e.g., positron emission with gamma photon pair) and the location of the event (e.g., line along which the event occurred). The detected events or emission information is stored in a memory 128. The timing information may include time-of-flight information. Further details regarding the use and processing of such information of the PET system 100 to reconstruct images are set forth in the above-referenced patent document. In non-PET examples, the signals from the detector array need not include or involve a time response or other coincidence analysis.

In this PET example, the processor 124 (or other component of the system 100) may include analog or digital discriminators (e.g., lead edge (LE) or constant fraction discriminator (CFD)) to determine timing information for the PET detectors from which the signals are received. Other devices or techniques may be used to determine the arrival time information. The arrival time information is used to determine a pair of the PET detectors associated with the same event and, thus, disposed along a line of response (LOR). The pair of PET detectors are paired based on a matching, comparison, or other processing of the arrival times of the visible photons. The arrival time information is also used to determine respective times of flight for the gamma photons detected by the pair of PET detectors. The manner in which the time-of-flight data is generated may include any processing techniques and devices.

In one exemplary embodiment, the memory 128 is a buffer, cache, RAM, removable media, hard drive, magnetic, optical, database, or other now known or later developed memory. The memory 128 is a single device or group of multiple devices. The memory 128 is shown within the PET system 100, but may be outside or remote from other components of the PET system 100, such as a database or PACS memory. The memory 128 may store data at different stages of processing. For example, the memory 128 may store raw data representing detected events without further processing, filtered or thresholded data prior to reconstruction, reconstructed data, filtered reconstruction data, an image to be displayed, an already displayed image, or other data. The memory 128 (or a different memory) may store data used for processing, such as storing the data after one or more iterations and prior to a final iteration in reconstruction. For processing, the data bypasses the memory 128, is temporarily stored in the memory 128, or is loaded from the memory 128.

In some cases, the memory 128 is additionally or alternatively a non-transitory computer readable storage medium storing processing instructions. For example, the memory 128 stores data representing instructions executable by the programmed processor 124 for reconstructing a positron emission tomography image for dynamic study and/or reconstructing an image in emission tomography. The instructions are provided on non-transitory computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software stored or otherwise embodied on a computer-readable memory, hardware, integrated circuits, firmware, micro code and the like, operating alone or in combination. Likewise, processing strategies may include multiprocessing, multitasking, parallel processing, and the like. In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

In this PET example, the processor 124 is a general processor, digital signal processor, graphics processing unit, application specific integrated circuit, field programmable gate array, digital circuit, analog circuit, combinations thereof, or other now known or later developed device for processing emission information. The processor 124 is a single device, a plurality of devices, or a network. For more than one device, parallel or sequential division of processing may be used. Different devices making up the processor 124 may perform different functions, such as one processor for filtering and/or subtracting raw data or reconstructed images. The processor 124 may include an application specific integrated circuit or field programmable gate array for performing various operations, such as iterative reconstruction. In one embodiment, the processor 124 is a control processor or other processor of a PET imaging system. The processor 124 is a processor of a computer or workstation. The processor 124 may operate pursuant to stored instructions to perform various acts described herein. For example, the processor 124 may be operable to process data indicative of detected events, determine time-of-flight data, and implement iterative reconstructions from different collections of data. The processor 124 may be configured by code or instructions sets stored on a memory, by firmware, and/or by hardware to perform any or all of the acts described herein.

In this PET example, the display 126 is a CRT, LCD, plasma screen, three-dimensional monitor, projector, printer, or other output device for showing images generated by the PET system 100. The display 126 may be used to display a user interface for controlling the PET system 100.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A device for detecting ionizing radiation, the device comprising:
   a radiation interaction region configured to generate light in response to an interaction with the ionizing radiation;
   an optical gain medium region in optical communication with the radiation interaction region and configured to amplify the light; and an energy source coupled to the optical gain medium region and configured to maintain a state of population inversion in the optical gain medium region;

wherein the optical gain medium region has an emission wavelength that corresponds with a wavelength of the light generated by the radiation interaction region.

2. The device of claim 1 wherein the radiation interaction region comprises a scintillation material.

3. The device of claim 2 wherein the scintillation material comprises an inorganic compound.

4. The device of claim 2 wherein the scintillation material comprises an organic compound.

5. The device of claim 2 wherein the scintillation material comprises an inorganic compound and an organic compound.

6. The device of claim 2 wherein the scintillation material is in a liquid state or a gaseous state.

7. The device of claim 1 wherein the radiation interaction region comprises a material configured to generate Cherenkov radiation in response to the interaction with the ionizing radiation.

8. The device of claim 1, further comprising an optical sensor to detect the amplified light.

9. The device of claim 8, further comprising a further optical gain medium region between the radiation interaction region and the optical sensor.

10. The device of claim 1 wherein the energy source comprises an optical light source to optically pump the optical gain medium region.

11. The device of claim 1 wherein the energy source comprises an electrical energy source to deliver charge carriers to the optical gain medium region.

12. The device of claim 11, further comprising:
a current sensor coupled to the electrical energy source to detect a level of current supplied to the electrical energy source; and
a processor coupled to the current sensor to detect the interaction based on the detected current level.

13. The device of claim 1, wherein the optical gain medium region comprises an array of semiconductor optical amplifiers.

14. The device of claim 1, further comprising a modulator configured to control emission from the optical gain medium region for amplification of the light generated by the interaction with the ionizing radiation, the modulator lowering a quality factor of a resonance cavity formed with the optical gain medium region.

15. The device of claim 1 wherein the optical gain medium region comprises a semiconductor laser having a band gap such that the emission wavelength of the optical gain medium region matches the wavelength of the light generated by the interaction region.

16. The device of claim 1, further comprising an optical sensor adjacent the radiation interaction region, and wherein the optical gain medium region surrounds the radiation interaction region.

17. The device of claim 1, wherein the radiation interaction region comprises a monolithic block having a first set of light-absorbing orthogonal surfaces and a second set of orthogonal surfaces, each orthogonal surface of the second set having a respective array of optical sensors of the optical gain medium region arranged thereon, adjacent optical sensors in the respective array of optical sensors being separated by septa.

18. The device of claim 1, further comprising an optical sensor to detect the amplified light, and wherein the radiation interaction region is configured as a waveguide to direct the amplified light to the optical sensor.

19. The device of claim 1, further comprising a controller coupled to the energy source to establish a quiescence time period after amplification of the light, during which the state of population inversion is not yet restored to a level operative for further amplification of the light.

20. A system for imaging based on emissions of ionizing radiation, the system comprising:
a set of detectors, each detector comprising:
a scintillation crystal configured to generate light in response to an interaction with the ionizing radiation; and
an optical amplifier in optical communication with the scintillation crystal and configured to amplify the light;
a power source coupled to the set of detectors and configured to establish a state of population inversion in the optical amplifier of each detector of the set of detectors; and
a processor in communication with the set of detectors to generate scan data based on the interaction with the ionizing radiation.

21. The system of claim 20 wherein the processor is configured to detect coincidence events based on multiple interactions with the ionizing radiation in respective pairs of detectors of the set of detectors.

22. The system of claim 20 wherein:
each detector further comprises an optical sensor in optical communication with the scintillation crystal and the optical amplifier to capture the amplified light; and
the optical sensor is in communication with the processor to provide a signal indicative of the amplified light captured by the optical sensor.

23. The system of claim 20 wherein:
each detector is configured to generate an indication of current provided by the power source to the optical amplifier of the detector to recover the state of population inversion depleted upon the interaction; and
the processor is configured to generate the scan data based on the indication of the current.

24. A system for imaging based on emissions of ionizing radiation, the system comprising:
a set of detectors, each detector comprising:
a radiation interaction region configured to generate Cherenkov radiation in response to interaction with the ionizing radiation; and
an optical amplifier in optical communication with the radiation interaction region and configured to amplify the Cherenkov radiation;
a power source coupled to the set of detectors and configured to establish a state of population inversion in the optical amplifier of each detector of the set of detectors; and
a processor in communication with the set of detectors to generate scan data based on the interaction with the ionizing radiation.

25. The system of claim 24 wherein the processor is configured to detect coincidence events based on multiple interactions with the ionizing radiation in respective pairs of detectors of the set of detectors.

26. The system of claim 24 wherein:
each detector further comprises an optical sensor in optical communication with the radiation interaction region and the optical amplifier to capture the amplified Cherenkov radiation; and
the optical sensor is in communication with the processor to provide a signal indicative of the amplified Cherenkov radiation captured by the optical sensor.

27. The system of claim 24 wherein:
  each detector is configured to generate an indication of current provided by the power source to the optical amplifier of the detector to recover the state of population inversion depleted upon the interaction; and
  the processor is configured to generate the scan data based on the indication of the current.

28. The system of claim 24, further comprising a time-of-flight positron emission tomography (PET) scanner, the time-of-flight PET scanner comprising the set of detectors.

* * * * *